March 15, 1960  F. S. LAPEYRE ET AL  2,928,117
SHRIMP VEIN REMOVER
Filed Feb. 26, 1957  3 Sheets-Sheet 1
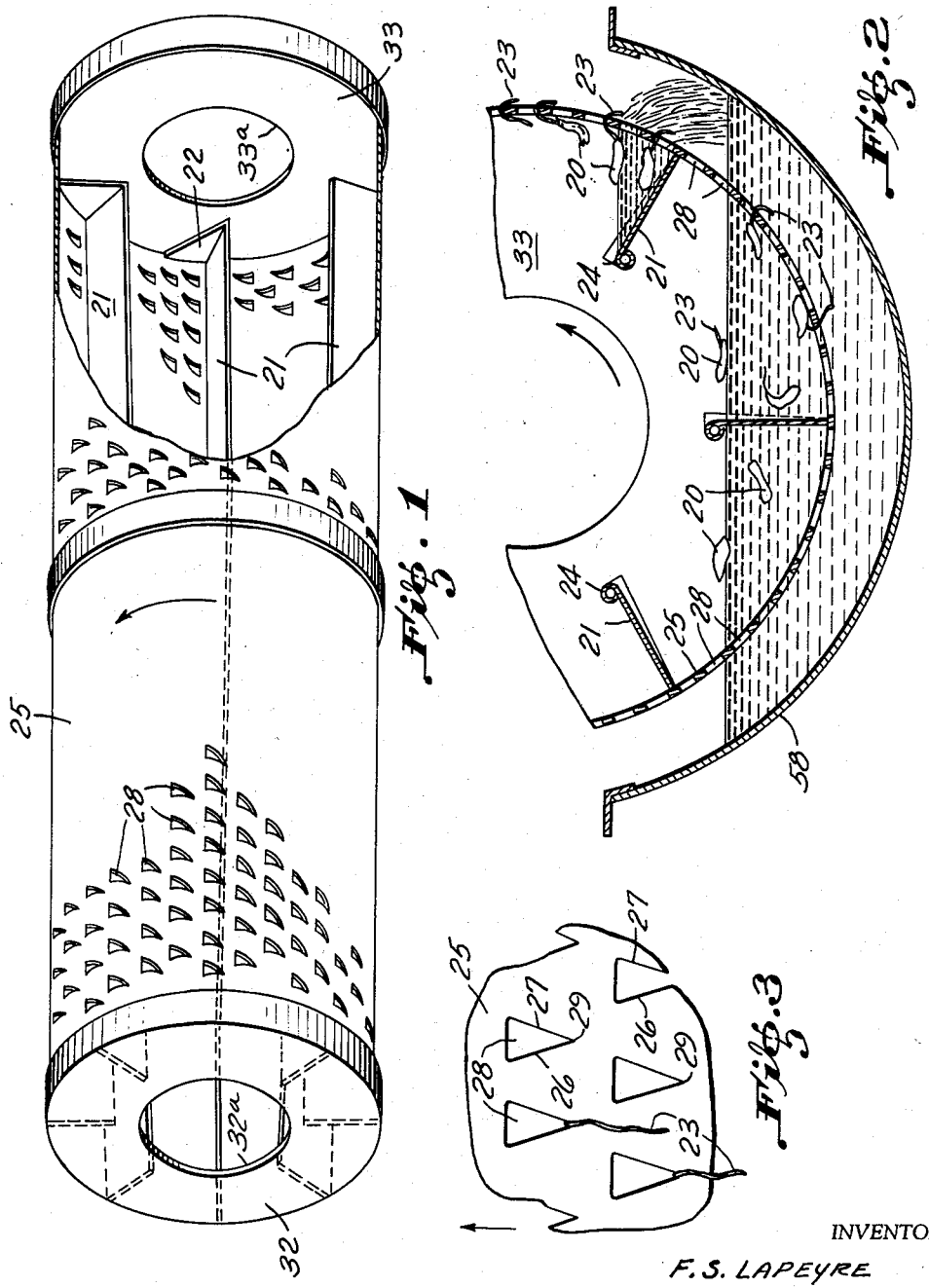
INVENTORS
F. S. LAPEYRE
J. M. LAPEYRE
BY
Wilkinson, Mawhinney & Thiebault
ATTORNEYS

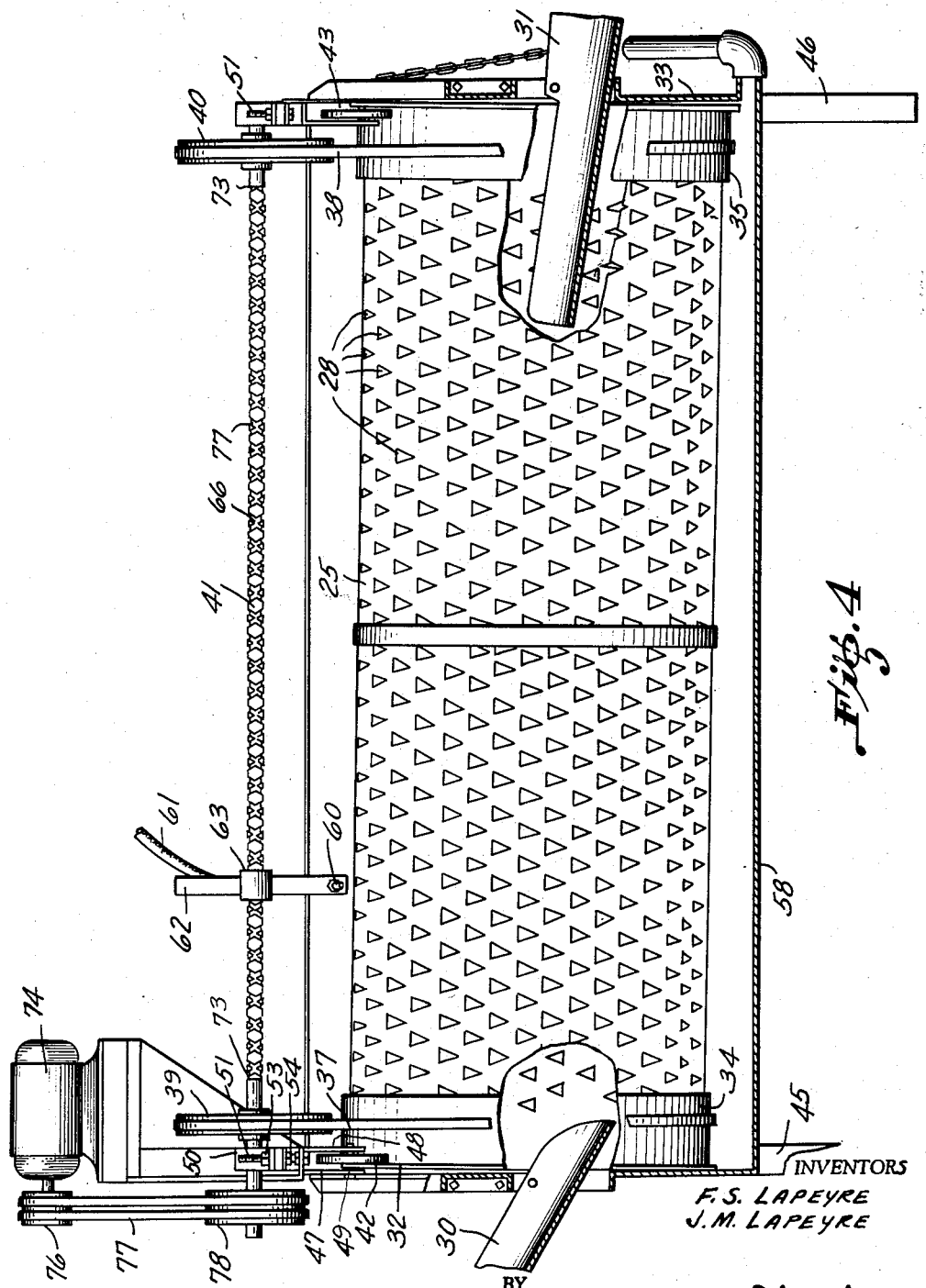

March 15, 1960  F. S. LAPEYRE ET AL  2,928,117
SHRIMP VEIN REMOVER
Filed Feb. 26, 1957  3 Sheets-Sheet 3
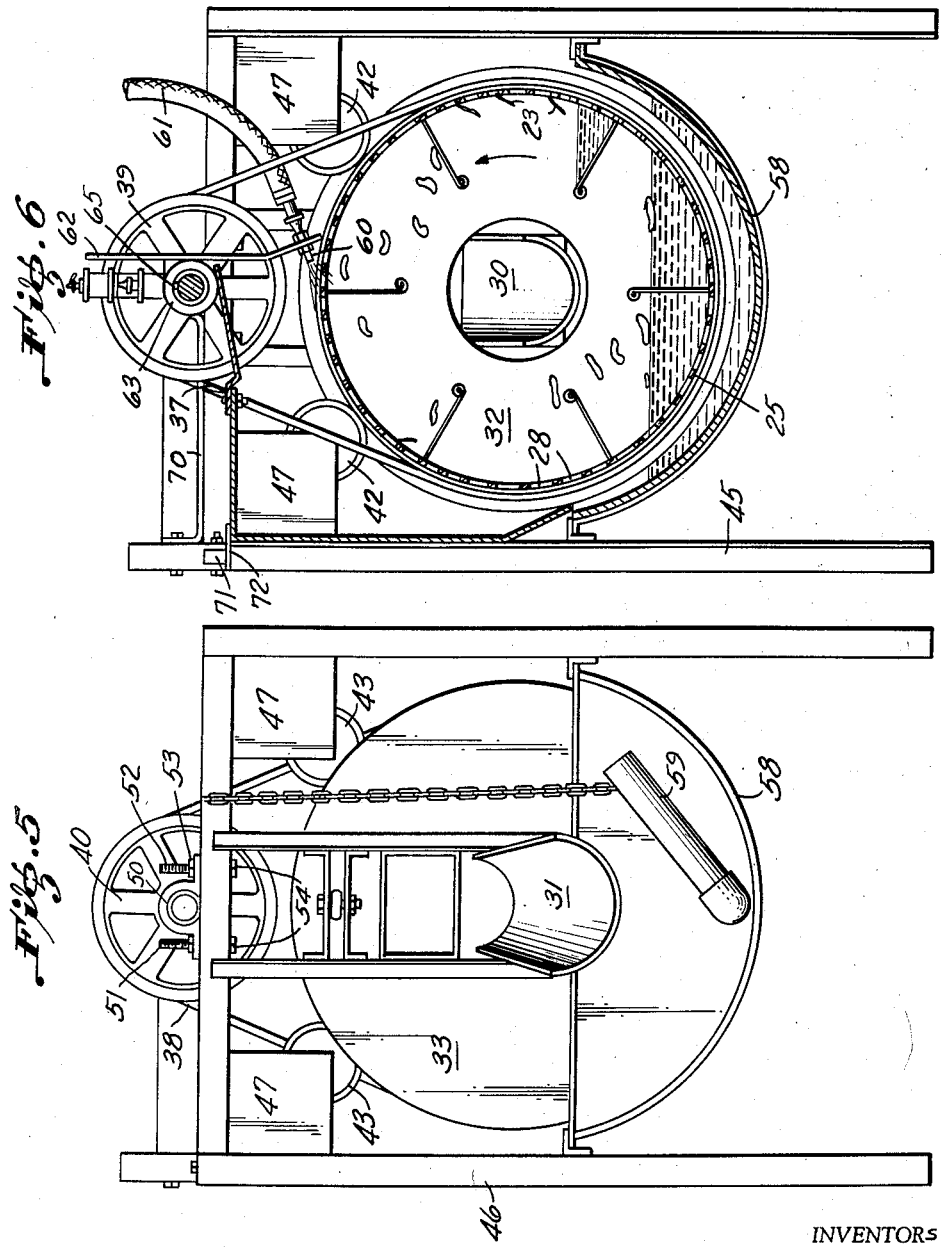
INVENTORS
F. S. LAPEYRE
J. M. LAPEYRE
BY
Wilkinson, Mawhinney & Thiebault
ATTORNEYS _United States Patent Office_

2,928,117
Patented Mar. 15, 1960

2,928,117

SHRIMP VEIN REMOVER

Fernand S. Lapeyre and James Martial Lapeyre, New Orleans, La., assignors to The Peelers Company, Houma, La., a partnership Application February 26, 1957, Serial No. 642,540

8 Claims. (Cl. 17—2)

The present invention relates to shrimp vein remover, and proposes certain improvements over our prior similarly entitled Patent No. 2,825,927, granted March 11, 1958.

In common with the objects of said prior patent it is an object of the present invention to provide a machine for removing the sand vein or alimentary canal which lies through a groove in the back of the shrimp and is protected by a membrane stretched thereover.

This membrane is suitably slit in a machine which forms the subject matter of our Patent 2,694,218, granted November 16, 1954, entitled Shrimp De-veining Machine.

In the machine, according to the prior patent aforesaid, substantially all of the back membranes of the shrimp are suitably slit, but not all of the veins so exposed are washed out by the action of the water used in connection with the operation of that machine.

In cases where the shrimp are subjected to further processing, such as "blanching" preliminary to canning, many more veins are removed. However, not all veins are so removed and some plants do not subject the shrimp to further processing after the de-veining operation.

Accordingly, the present invention aims to provided a device to mechanically remove substantially all veins from shrimp whose backs have previously been slit, either on the de-veining machine according to our prior patent, or otherwise. For instance, a machine according to the present invention may be arranged in series with the shrimp de-veining machine according to our prior patent so that the present shrimp vein remover would receive the shrimp from the aforesaid shrimp de-veining patented machine.

According to our prior patent aforesaid, the tumbler or drum incorporates a lip type perforation, wherein the lips protrude or project into the interior of the drum or tumbler for the purpose of engaging the alimentary tracts of the shimp.

However, pursuant to the present invention, the protruding lips have been dispensed with and the present invention proposes to remove the alimentary tracts of the shrimp through a substantially different principle of operation in which the tumbler or drum is provided with perforations of a substantially triangular type wherein corners of the perforations, which are the trailing corners, form wedges which engage the exposed alimentary tract whereby the tract or vein may be pulled from the shrimp incident to the rotation of the tumbler, or the weight of the shrimp devolving on the vein or the tract will of itself cause severance of the shrimp from the vein when, during the course of rotation of the tumbler, the shrimp body is carried above the surface level of water through which the lower portion of the drum rotates.

Another object of the invention is to provide on the inside of the rotary drum shelves or supports for the shrimp, which will not only lift the shrimp but also lift a body of water which, incident to its pouring out through perforations of the drum, will cause the tracts or veins to be entered through the perforations and thereby be engaged by the wedged shaped slots and hooked or locked therein in a manner to exert pull upon the bodies of these shrimp to which they are connected.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a fragmentary isometric view of an improved drum or tumbler constructed in accordance with the present invention.

Figure 2 is a fragmentary cross-sectional view through the improved drum and basin.

Figure 3 is a plan view of a portion of the wall of the drum or tumbler showing a typical form of perforation and wedge slot.

Figure 4 is a longitudinal sectional view taken through the basin or tank and showing the drum and its driving mechanism in side elevational view with parts broken away and parts shown in section.

Figure 5 is an end elevational view of the improved device taken from the eduction end; and Figure 6 is a cross-sectional view taken through the frame work of the machine and through the basin or tank and tumbler and looking toward the induction end of the machine.

Referring more particularly to the drawings and for the present to Figures 1, 2 and 3, 20 designates peeled shrimp meat and 23 the sand veins or alimentary canals or tracts from which one end has been disengaged from the body of the shrimp while the other end of the vein remains attached to such shrimp body.

The drum or tumbler 25 may be of sheet metal or other appropriate material and has a cylindrical wall containing numerous perforations which are preferably of a substantially triangular form as shown more particularly in Figure 3. The perforations are shown to have convergent walls 26 and 27 leading to an apex or constricted portion 29. As shown by the arrows in Figures 1, 2 and 3, the apexes 29 are at the trailing ends of the perforations 28. The walls 26 and 27, so related, form wedge slots or V-notches or crotches in which are to become wedged the veins or tracts 23.

As appears more particularly from Figures 1 and 2, supports which may be in the form of shelves or baffles 21 are disposed, preferably spirally within the drum or tumbler 25, these shelves or baffles being supported in any suitable manner, as for instance by welding to the inner wall of the drum and preferably having end flanges 22 which are turned at substantially right angles to the shelves or baffles 21 and may also be welded to the inner surface of the drum wall 25. These end flanges act to reinforce and strength the shelves or baffles 21 and provide additional surfaces for attachment to the drum. It will be understood, however, that the shelves or baffles 21 may be carried within the drum in any other suitable manner.

The shelves or baffles 21 may also be reinforced along their inner free edges for instance by rolling beads 24 over from the sheet metal of which these shelves or baffles 21 may be conveniently made.

As shown in Figure 2 a basin or tank 58 is provided into which the lower portion of the perforated drum or tumbler 25 is entered whereby a body of water in the basin or tank 58 up to a pre-selected level will enter through the perforations into the interior space of the drum and maintain a body of water always in the lower portion of the rotating drum, such water passing freely into and out from the drum through the perforations 28.

3

In Figure 1 an upper drum head 32 is provided with an induction opening 32ª for the entrance of peeled shrimp whose back membranes have been slit, as by the use of our patented machine aforesaid, or otherwise. This same Figure 1 also illustrates a lower drum head 33 having an eduction opening 33ª for the discharge of the shrimp after having been subjected to a de-veining operation pursuant to the invention.

As shown more particularly in Figures 4–6 inclusive, 30 designates an introductory chute into which the shrimp are fed into the induction end of the drum 25, and 31 represents the discharge chute through which the treated shrimp are removed from the eduction end of the drum in a continuous operation.

The introductory chute 30 extends through the upper drum head 32, while the discharge chute 31 extends through the lower drum head 33.

The drum heads 32 and 33 are provided with cylindrical flanges 34 and 35, respectively, in which are produced grooves running annularly around the flanges and preferably of a V-shaped cross-section to receive the upper and lower belts 37 and 38 which are also preferably of a V-cross-section.

The drum 25 is slung in the belts 37 and 38 and has no other support. In other words, the belts 37 and 38 not only drive but support the drum 25.

The belts 37 and 38 are supported and driven by upper and lower pulleys 39 and 40 which are fast upon a drive shaft 41.

The belts 37 and 38 pull the drum 25 up against upper and lower positioning casters or rollers 42 and 43. There are only two casters or rollers 42 and only two casters or rollers 43. As shown in Figures 5 and 6, these pairs of rollers 42 and 43 are disposed only at the upper side of the drum 25. There are no supporting rollers of any kind below the drum. The function of the rollers or casters 42, 43 is simply to center or position the drum in the frame. The drum 25 must be substantially centered within the frame so as to maintain its proper position with respect to the liquid tank or basin 58.

The drum 25 is preferably suspended upon a slight inclination with its higher end at the upper head 32 where the shrimp are fed to the drum and with its lower end at the head 33.

The upper positioning casters 42 are carried by an upper frame 45 while the lower positioning casters 43 are rotatably mounted in a lower frame 46. Webs 47 and 48 of the frame 45 receive the shafts 49 of the rollers or casters 42. A like support may be provided for the other or lower casters 43.

The drive shaft 41 may be supported in bearings 50 which are adjustable through the adjusting screws 51 and the pairs of nuts 53 and 54. A similar adjusting device may be duplicated at the lower frame 46. By loosening the upper adjusting nuts 53 and running the lower adjusting nuts 54 upwardly on the screws 51 and 52, the entire drive assembly including the shaft 41 and the two pulleys 39 and 40 may be elevated to take up any slack in the belts 37 and 38 and to maintain the drum or its flanges 34, 35 tightly up against the casters 42, 43. After adjustment, the nuts 53 may be tightened down upon the screws 51 and 52.

As shown in Figure 5, an adjustable overflow pipe 59 connects with the tank and projects outwardly of the lower frame 46. This pipe may be rotated about its elbow connection to elevate or lower its open discharge end which will thus control the liquid level in the tank 58.

Referring more particularly to Figures 4 and 6, while the water to supply the tank 58 may be received from any appropriate source, it is economically received from a nozzle 60 which is given a traversing movement longitudinally of the drum and is so directed with respect to the perforations 28 that it has a second function of clearing the wedge slots 29 of accumulated veins 23.

4

The nozzle 60 is in communication with any desired source of water or other liquid supply through a flexible hose connection 61 which permits the nozzle 60 to move backwardly and forwardly along the surface of the drum. The nozzle 60 is carried and moved by a supporting arm 62, which arm is in turn supported and moved by a sleeve 63 which is slidable over the drive shaft 41.

As shown more particularly in Figure 6, the sleeve 63 carries an inwardly projecting key 65 which engages with the worm grooves 66 and 67 of the shaft 41. These grooves are right and left hand, respectively, and are of the proper lead to give the nozzle 60 a desired rate of feed back and forth over the drum. The sleeve 63, arm 62 and nozzle 60 are prevented from rotation by outrigger bracket 70 connected to the sleeve 63. The outer free end of the bracket 70 carries a roller 71 rolling upon a track 72 mounted in the frame of the machine.

Transfer grooves 73 are provided at the ends of the worm grooves 66, 67 to permit the key 65 to transfer from one spiral groove to the other at the opposite ends of its travel. In this way, the nozzle 60 is automatically reversed so that it travels back and forth in a reciprocating motion axially along the surface of the drum 25.

In Figure 4 a form of drive is shown for the shaft 41 to involve an electric or other motor 74 for driving pulleys 76 and entrained belts 77 which in turn drive the pulleys 78 affixed to the drive shaft 41.

In operation, the motor 74 drives the worm shaft 41, which through the worm drive shifts the arm 62 and water spray nozzle 60 back and forth along the outer surface of the drum. At the same time the shaft 41, through the belts 37, 38 drives the drum 25, that is rotates the same and subjects the peeled shrimp therein to a tumbling action.

The peeled shrimp are introduced through the chute 30 and are withdrawn at the other end of the drum through the chute 31.

The water spray nozzle 60 will build up a body of water in the lower portion of the tank 58 and lower portion of the drum 25, for instance as shown in Figure 2, such water level being controlled by the swinging pipe 59 shown in Figure 5.

As the tumbler revolves, it carries around with it the shelves or baffles 21 which elevate shrimp and water, as best seen in Figure 2.

As the shelves 21 rotate through the lower segment of the drum they will pass through water and pick up both water and shrimp, the shelves being imperforate. As these shelves move counter-clockwise as shown in Figure 2, they will eventually emerge from the body of water and in so doing they will elevate both the shrimp and an entrapped body of water. As soon as this entrapped body of water rises above the level of the water in the tank it will proceed to flow out through the perforations 28 as shown in Figure 2. The current caused by the flow of this elevated water through the perforations 28 causes the loose veins to flow through the perforated openings 28. As the tumbler or drum continues to rotate, the veins or alimentary tracts are caused to wedge in the trailing ends 29 of the perforations 28 by virtue of the rotation of the drum and the resisting force of gravity.

Once the alimentary tract 23 is wedged in the perforation, it is unable to slip back into the interior of the drum. The shrimp, therefore, due to its own weight, will fall free of the alimentary tract, leaving said alimentary tract engaged in the wedged shaped trailing edge 29 of the perforation. These alimentary tracts, or veins, are then flushed out by water under high pressure introduced through the nozzle 60. Although the nozzle may be directed with or against the direction of rotation of the drum, it is preferably arranged so that as the perforations pass the nozzle the stream of water flowing therefrom will be pointed in a direction to move the veins out of the wedge portions of the slots.

The elevating shelves or baffles 21 are inclined slightly toward the discharge end of the drum and therefore cause the shrimp to advance slightly toward the discharge end of the tumbler each time they are elevated and dropped. It will be understood that as the shelves 21 rise to the top portion of the drum, they will assume an inclined position with their free ends 24 pointed downwardly so that any shrimp on these shelves will lose the support of the shelves and the weight of the shrimp will tend to cause the same to fall downwardly into the lower portion of the drum. This will exert a tugging action by the weight of the shrimp body upon the vein which is caught in the wedge shaped slot and the same will be effective to cause severance of the shrimp body from the entrapped vein.

At the discharge end of the drum, such shrimps are dropped into the discharge chute 31 or a flume which carries the de-veined shrimp meats to their desired destination.

It will be appreciated that according to the present invention there are no protruding lips which could or might cause a rasplike action upon the shrimp and for this reason the invention improves the yield.

Although we have disclosed herein the best form of the invention known to us at this time, we reserve the right to all such modifications and changes as may come within the scope of the following claims.

What is claimed is:

1. A shrimp vein remover comprising a drum having at least one perforation with a constricted portion, drum operating means coupled to drive the drum in a direction in which the constricted portion of the perforation is trailing, shrimp and liquid lift means carried on the inside of the drum adjacent to the perforation and so related to the perforation as to direct a stream of fluid over the shrimp through the perforation to drive the veins into the constricted portion, liquid means associated with the lift means to supply liquid to the lift means, said lift means having a free unobstructed inner end portion to induce sliding of the shrimp therefrom causing breaking from the shrimp of the attachment of the veins caught in said constricted portion of the perforation.

2. A shrimp vein remover comprising a receptacle containing a body of liquid and undeveined shrimp, a support, a portion of which is immersed in the liquid in said receptacle, shrimp lift means associated with the support for movement therewith, shrimp vein grasping means associated with the support, and drive means coupled to said support to drive the lift means for moving the lift means through a first movement through the liquid body to acquire a charge of liquid together with shrimp, subsequently raising the lift means out of the body of liquid in such relation that the liquid from the lift means will pour through the grasping means and induce the veins to be caught in the grasping means, and finally moving said lift means to drop the shrimp from the lift means thereby breaking the attachment with the shrimp of the veins caught in the grasping means.

3. A shrimp vein remover as claimed in claim 2, in which the support is a drum in the wall of which is the vein grasping means.

4. A shrimp vein remover as claimed in claim 3, in which the shrimp lift means is a shelf carried on the inside of the drum and which extends along a substantial length of the drum.

5. A shrimp vein remover as claimed in claim 4, characterized by the fact that the shelf extends substantially radially of the drum.

6. A shrimp vein remover as claimed in claim 5, wherein the vein grasping means is a wedge-shaped perforation having its narrow end trailing with respect to the direction of rotation of the drum, and said drive means being coupled to drive the drum.

7. A shrimp vein remover comprising a trough for containing a body of liquid and shrimp, a rotary drum having a lower portion immersed in the liquid in the trough and having an upper portion above the level of the liquid, means connected to rotate the drum, and imperforate shelves extending inwardly of the drum along a substantial length thereof and rotating therewith for receiving charges of liquid together with shrimp, said drum having wedge-shaped perforations therethrough with the constricted ends of the perforations trailing the direction of rotation of the drum.

8. A device for removing veins from shelled shrimp in which the shrimp with the back membranes slit exposing the veins are placed in a body of liquid, comprising a support having vein grasping means, liquid and shrimp lifting means carried by said support, drive means coupled to drive said support for moving the grasping and lifting means through the body of liquid to acquire a charge of liquid and shrimp, and subsequently moving the grasping and lifting means above the liquid body with the lifting means declined toward the grasping means whereby to cause the charge of liquid on the lifting means to be decanted through the grasping means and the veins moved into the grasping means, and finally moving the grasping and lifting means to a position where the lifting means declines away from the grasping means to release the shrimp bodies to drop by gravity and break the attachment of the veins to the shrimp bodies.

References Cited in the file of this patent

UNITED STATES PATENTS

| 1,317,898 | Shepard | Oct. 7, 1919 |
| 1,383,162 | Sprague | June 28, 1921 |
| 2,652,588 | Harris | Sept. 22, 1953 |
| 2,825,927 | Lapeyre et al. | Mar. 11, 1958 |

FOREIGN PATENTS

| 643,383 | France | May 15, 1928 |
| 475,307 | Germany | Apr. 22, 1929 |